US007754085B2

(12) United States Patent
Long et al.

(10) Patent No.: US 7,754,085 B2
(45) Date of Patent: Jul. 13, 2010

(54) MAGNETOMECHANICAL DEFORMATIONS OF NONUNIFORM POROUS MAGNETIC ARCHITECTURES

(75) Inventors: Jeffrey W Long, Alexandria, VA (US); Debra R Rolison, Arlington, VA (US); Michael S. Logan, Rochester, NY (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 949 days.

(21) Appl. No.: 11/467,288

(22) Filed: Aug. 25, 2006

(65) Prior Publication Data

US 2007/0069427 A1     Mar. 29, 2007

Related U.S. Application Data

(60) Provisional application No. 60/713,618, filed on Aug. 25, 2005.

(51) Int. Cl.
*H05B 6/00* (2006.01)
*B01D 35/06* (2006.01)

(52) U.S. Cl. ........................ 210/695; 210/222; 210/223; 264/430

(58) Field of Classification Search .................. 210/222, 210/223, 695; 95/28, 274; 264/430
See application file for complete search history.

(56) References Cited

U.S. PATENT DOCUMENTS 3,477,948 A * 11/1969 Inoue .......................... 210/695

OTHER PUBLICATIONS

C.J. Brinker et al., "Theory of Deformation and Flow in Gels," *Sol-Gel Science*, Academic Press, New York, Chapter 7, pp. 407-451 (1990).
M. Zrinyi et al., "Deformation of ferrogels induced by nonuniform magnetic fields," *J. Chem. Phys*. 104, 8750 (1996).
Lopatnikov et al., "A thermodynamically consistent formulation of magnetoporoeleasticity," *Int. J. Solids Structures*, vol. 35, Nos. 34-35, pp. 4637-4657 (Dec. 1998).
M. Zrinyi et al., "Muscular contraction mimicked by magnetic gels," *Int. J. Mod. Phys*. B15, 557 (2001).
A.E. Gash et al., "Use of epoxides in the sol-gel synthesis of porous iron(III) oxide monoliths from Fe(III) salts," *Chem. Mater*., vol. 13, No. 3, pp. 999-1007 (Mar. 2001).
T. Sato et al., "Synthesized ultrafine magnetic minerals and their suppressive effect on the growth of turfgrass mold," *Int. J. Miner. Process*, vol. 62, pp. 95-110 (May 2001).
Y.L. Raikher et al., "Magnetodeformational effect in ferrogel samples," *J. Magn. Magn. Mater*. 258-259, 477 (2003).

(Continued)

*Primary Examiner*—David A Reifsnyder
(74) *Attorney, Agent, or Firm*—Amy L. Ressing (57) ABSTRACT

A method for controlling pore size of a membrane that includes providing a porous magnetic architecture and magnetizing the porous magnetic architecture. The porous magnetic architecture changes pore size when magnetized. A method for inhibiting the mobility of a solute through a membrane includes magnetizing a porous magnetic architecture in a flow stream that includes a solute. A membrane system for a solute includes a porous magnetic architecture disposed within a flow stream that also includes a solute, and a magnetic source disposed such that the nonuniform porous magnetic architecture is selectively magnetized.

27 Claims, 7 Drawing Sheets

OTHER PUBLICATIONS

J. Gwak et al., "Synthesis and characterization of porous ferromagnetic membranes," *Micropor. Mesopor. Mater.*, vol. 63, pp. 177-184 (2003).

D.C. Jiles, "Recent advances and future directions in magnetic materials," *Acta Materialia*, vol. 51, No. 19, pp. 5907-5939 (Nov. 25, 2003).

J. Andersson et al., "Influences of material characteristics on ibuprofen drug loaking and release profiles from ordered micro- and mesoporous silica matrices,"*Chem. Mater.*, vol. 16, No. 21, pp. 4160-4167 (Oct. 19, 2004).

J.W. Long et al., "Nanocrystalline oxide aerogels as mesoporous magnetic architectures," *J. Am. Chem. Soc.* 126, 16879 (2004).

J.W. Long et al.,"Synthesis and characterization of Mn-FeOx aerogels with magnetic properties," *J. Non-Cryst. Solids* 350, 182 (2004).

I. Smirnova et al., "Feasibility study of hydrophilic and hydrophobic silica aerogels as drug delivery systems," *J. Non-Cryst. Solids*, vol. 350, pp. 54-60 (Dec. 15, 2004).

A.V. Teixeira et al., "Local deformations of ferrogels induced by uniform magnetic fields," *J. Magn. Magn. Mater.* 289, 126 (2005).

Y.L. Raikher et al., "Magnetodeformation effect in ferrogel objects," *J. Magn. Magn. Mater.* 289, 62 (2005).

I.O. Shklyarevskiy et al., "Magnetic deformation of self-assembled sexithiophene spherical nanocapsules," *J. Am. Chem. Soc.* 127, 1112 (2005).

Z. Lu et al., "Magnetic switch of permeability for polyelectrolyte microcapsules embedded with Co@Au nanoparticles," *Langmuir* 21, 2042 (2005).

A.E. Markaki et al., "Magneto-mechanical actuation of bonded ferromagnetic fibre arrays," *Acta Materialia*, vol. 53, pp. 877-889 (2005).

* cited by examiner

MAGNETOMECHANICAL DEFORMATIONS OF NONUNIFORM POROUS MAGNETIC ARCHITECTURES

CROSS-REFERENCE TO RELATED APPLICATIONS

This application is a non-provisional application of U.S. Provisional Application No. 60/713,618, filed Aug. 25, 2005, which is incorporated herein by reference in its entirety.

FIELD OF THE INVENTION

The present invention is generally directed to nonuniform porous magnetic architectures.

BACKGROUND OF THE INVENTION

Magnetic materials, including a variety of metals, alloys, and metal oxides are vital components in many technological applications. The physical properties of such materials are often affected by their magnetization resulting in such phenomena as magnetoresistance and magnetomechanical deformation. Magnetomechanical properties are observed when a change in magnetization causes strain within a solid. Magnetomechanical materials can be broadly classified into one of two types: (i) magnetoelastic materials in which the structural deformations are reversible once the magnetic field is removed; and, (ii) magnetoplastic materials in which the initial structure is not necessarily recovered on removal of the magnetic field. See, D. C. Jiles, "Recent advances and future directions in magnetic materials," *Acta Materialia*, Vol. 51, No. 19, pp. 5907-5939 (Nov. 25, 2003). Shape memory alloys are a prime example of magnetoplastic materials, and deformations as large as 5-10% are often observed.

Magnetomechanical properties can be further defined by the type and origin of the deformation that is observed. Magnetostriction is defined as the fractional change in length of a material when magnetized. This phenomenon may occur spontaneously due to a magnetic phase transition, for example, having the temperature fall below the blocking temperature, or due to the application of an external magnetic field, and the resulting deformation is attributed to the rotation and movement of magnetic domains within the solid. Magnetostrictive solids, typically crystalline metals and alloys, have been extensively investigated for the past several years, with target applications in sensors and actuators.

Large magnetomechanical effects are also observed for a class of materials known as ferrogels, which are composites that include magnetic particles dispersed within a polymer gel matrix. The magnetodeformation of ferrogels differs from the customary magnetostriction of crystalline materials, in that ferrogels deform as a result of the interplay of pondermotive forces between magnetic particle and the elasticity of the polymer matrix. See Y. L. Raikher et al., "Magnetodeformational effect in ferrogel objects," *J. Magn. Magn. Mater.*, Vol. 258-259, pp. 477-479 (2003) and M. Zrinyi, et al., "Deformation of ferrogels induced by nonuniform magnetic fields," *J. Chem. Phys.*, Vol. 104, No. 21, pp. 8750-8756 (Jun. 1, 1996). Ferrogels may exhibit elongation, contraction, rotation, or bending in response to a magnetic field gradient, depending on specific structure of the ferrogel composite.

Lopatnikov et al. describe the deformation of a magnetically inert porous solid that has been infiltrated with a ferromagnetic fluid having a magnetomechanical effect in the presence of a magnetic field. See S. Lopatnikov et al., "A thermodynamically consistent formulation of magnetoporoeleasticity," *Int. J. Solids Structures*, Vol. 35, Nos. 34-35, pp. 4637-4657 (December 1998).

Magnetically active materials that also contain defined pores or cavities have received little attention. Magnetomechanical properties have been observed in capsule-like structures with dimensions ranging from microns to tens of nanometers. For example, Lu et al. described polyelectrolyte "microcapsules" that contain magnetic Co@Au nanoparticles in the capsule wall. See Z. Lu et al., "Magnetic switch of permeability for polyelectrolyte microcapsules embedded with Co@Au nanoparticles," *Langmuir*, Vol. 21, pp. 2042-2050 (2005). The application of an oscillating magnetic field disrupts the capsule wall, resulting in changes in the permeability of the capsule wall to macromolecules. Lu et al. proposed using the magnetically controlled permeability of these structures for drug delivery applications.

In another example, Shklyarevskiy et al. reported the deformation in a magnetic field of "nanocapsules" comprising a supramolecular assembly of sexithiophene amphiphiles. See I. O. Shklyarevskiy, et al., "Magnetic deformation of self-assembled sexithiophene spherical nanocapsules," *J. Am. Chem. Soc.*, Vol. 127, pp. 1112-1113 (2005). In that case, the deformation was ascribed to the large anisotropy in the diamagnetic susceptibility of sexithiophene-based molecule. Although capsule-like structures are potentially useful in dispersed forms, porous magnetic structures with macroscopic dimensions will also be desirable for membrane, sensor and actuator applications.

Much like the ferrogels discussed above, Makaki et al. recently described an example of such a porous magnetic structure, demonstrating that strongly bonded porous assemblies of ferrimagnetic metallic fibers (~100 µm in diameter and 4 mm in length) undergo magnetomechanical actuation. See A. E. Markaki et al., "Magneto-mechanical actuation of bonded ferromagnetic fibre arrays," *Acta Materialia*, Vol. 53, pp. 877-889 (2005). In the presence of an applied magnetic field the individual fibers tend to align with field resulting in the deformation of the fiber assembly. The authors report length changes of 0.2% for the fiber assembly, but did not investigate how the magnetomechanical distortion affected the size, shape, or connectivity of the pore structure.

Porous monolithic nanoarchitectures, or nanostructures, with compositions of such magnetic oxides as $Fe_3O_4$, $\gamma$-$Fe_2O_3$, and $MnFe_2O_4$ and the synthesis thereof were described by Long, et al. See J. W. Long et al., "Nanocrystalline iron oxide aerogels as mesoporous magnetic architectures," *J. Am. Chem. Soc.*, Vol. 126, pp. 16879-16889 (2004) and J. W. Long et al., "Synthesis and characterization of Mn—FeOx aerogels with magnetic properties," *J. Non-Cryst. Solids*, Vol. 350, pp. 182-188 (2004), both of which are incorporated by reference herein in their entirety.

Also, mesoporous forms of $SiO_2$, including nonmagnetic aerogels, have also recently been show to be effective vehicles for the delivery of common drugs, where drug release occurs passively over time, as controlled by the size, geometry, and connectivity of the pores, as well as the available surface area. See I. Smirnova et al., "Feasibility study of hydrophilic and hydrophobic silica aerogels as drug delivery systems," *J. Non-Cryst. Solids*, Vol. 350, pp. 54-60 (Dec. 15, 2004) and J. Andersson et al., "Influences of material characteristics on ibuprofen drug loading and release profiles from ordered micro- and mesoporous silica matrices," *Chem. Mater.*, Vol. 16, No. 21, pp. 4160-4167 (Oct. 19, 2004).

BRIEF SUMMARY OF THE INVENTION

The present application is generally directed to the magnetomechanical effects on pore volume of porous magnetic architectures, also referred to as nanostructures.

In particular, the present application is generally directed towards a method for controlling pore size of a membrane that includes at least the steps of providing a membrane that includes a nonuniform porous magnetic architecture having a first pore size and magnetizing the nonuniform porous magnetic architecture. The nonuniform porous magnetic architecture has a second pore size when magnetized. The method may also include ceasing magnetizing the porous magnetic architecture. The nonuniform porous magnetic architecture then has a third pore size when subsequently not magnetized that is about equal to the first pore size.

The present invention is also generally directed to a method for selectively inhibiting the mobility of a solute through a membrane that includes providing a solute in a flow stream, providing in the flow stream a membrane including a nonuniform porous magnetic architecture comprising a network of metal ferrite particles, and magnetizing the nonuniform porous magnetic architecture. When magnetized, the mobility of the solute through the nonuniform porous magnetic architecture is inhibited. In another embodiment of the present invention, the nonuniform porous magnetic architecture may have a first pore size prior to the magnetizing and a second pore size upon magnetizing, and the first pore size may be greater than the second pore size. The second pore size may be sufficiently small relative to a particle size or molecular size of the solute so as to inhibit mobility of the solute through the nonuniform porous magnetic architecture. In yet another embodiment, the solute may be affected by internal magnetic forces of the nonuniform porous magnetic architecture upon magnetizing in order to inhibit mobility of solute through the nonuniform porous magnetic architecture.

The present invention is also generally directed to a membrane system for a solute that includes a solute in a flow stream, a nonuniform porous magnetic architecture comprising a network of metal ferrite particles disposed within the flow stream, and a magnetic source disposed such that the nonuniform porous magnetic architecture is selectively magnetized by the magnetic source. In an embodiment of the present invention, the nonuniform porous magnetic architecture may have a first pore size when not magnetized by the magnetic source and a second pore size when magnetized by the magnetic source. The second pore size may be sufficiently small relative to a particle size or molecular size of the solute so as to inhibit mobility of the solute through the nonuniform porous magnetic architecture. In another embodiment, the solute may be affected by internal magnetic forces of the nonuniform porous magnetic architecture when magnetized by the magnetic source in order to inhibit mobility of the solute through the nonuniform porous magnetic architecture.

The foregoing and other features and advantages of the present invention will be apparent from the following, more particular description of a preferred embodiment of the invention, as illustrated in the accompanying drawings.

DETAILED DESCRIPTION OF THE INVENTION

Preferred embodiments of the present invention are now described with reference to the Figures, in which like reference numerals are generally used to indicate identical or functionally similar elements. Also in the Figures, the left most digit of each reference numeral generally corresponds to the Figure in which the reference numeral appears. While specific details of the preferred embodiments are discussed, it should be understood that this is done for illustrative purposes only. A person skilled in the relevant art will recognize that other configurations and arrangements can be used without departing from the spirit and scope of the invention. It will also be apparent to a person skilled in the relevant art that this invention can also be employed in other applications.

The present invention generally includes porous magnetic architectures or structures, a method of making the porous magnetic architectures, a method of controlling the porosity of the porous magnetic architectures by magnetizing the porous magnetic architectures, the use of the porous magnetic architectures for impeding or blocking the flow of a solute through porous magnetic architectures, for example via a membrane system that includes the porous magnetic architectures. The porous magnetic architectures are formed from a network of nanoparticles of a mixed-metal ferrite with the general formula $MFe_2O_4$, where M=Fe, Mn, Co, Ni, Zn, and Cu.

Figure 1:
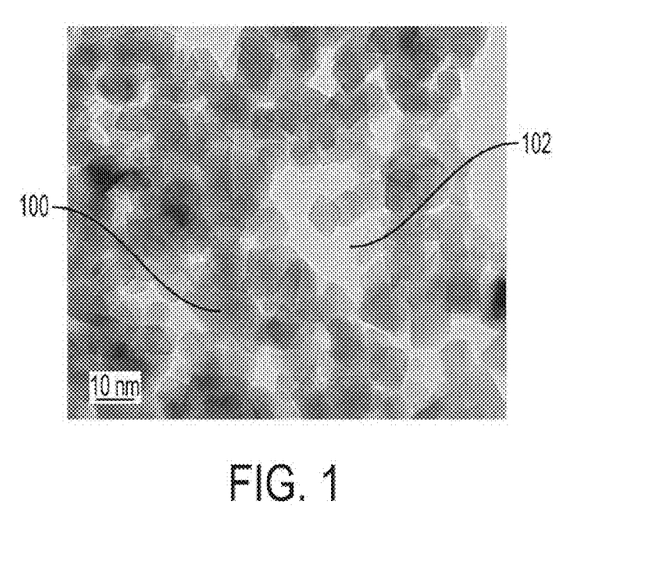
FIG. 1 is a transmission electron micrograph of an example of a porous magnetic architecture of the present invention.

The porous magnetic architectures of the present invention may be sol-gel-derived and are an aperiodic, or irregular, three-dimensional network of nanoparticles intermingled with a through-connected network of void volume. The aperiodic nature of the network and the small particle size contribute to a nonuniform internal magnetization. FIG. 1 is a transmission electron micrograph for a nanocrystalline $Fe_3O_4/\gamma\text{-}Fe_2O_3$ porous magnetic architecture aerogel. FIG. 1 illustrates the porous magnetic architecture 100 and the voids or pores 102 provided by the configuration of the porous magnetic architecture 100.

It has been determined that by varying such parameters as the composition of the sol-gel synthesis, the drying protocol used, and post-synthesis thermal processing conditions, these porous magnetic architecture can be generated with effective control of the pore sizes (for example, 1-100 nm) and pore-size distributions, surface areas, and nanocrystallite sizes (for example, 3-25 nm). Further, the magnetic properties of the porous magnetic architecture can be tuned by thermal treatments. With such thermal treatment, smaller particles (for example, about 5-20 nm) generally exhibit superparamagnetism with no remanence magnetization. Larger particles (for example, greater than 25 nm) generally exhibit ferrimagnetism. The magnetic properties of these materials are further dependent on the materials used to form the porous magnetic architectures. For example, the magnetization of $MFe_2O_4$ ferrites decreases in the series for M=Mn, Fe, Co, Ni, Cu, and Zn. See T. Sato et al., "Synthesized ultrafine magnetic minerals and their suppressive effect on the growth of turfgrass mold," *Int. J. Miner. Process*, Vol. 62, pp. 95-110 (May 2001), which is incorporated by reference herein in its entirety. Additionally, the nanocrystalline phases of iron oxide porous magnetic architectures, and thus their magnetic character, can be effectively toggled between nanocrystalline $Fe_3O_4$ and defective or poorly crystalline $\gamma\text{-}Fe_2O_3$ phases with controlled atmosphere treatments (inert or low partial pressure of oxygen vs. oxidizing). The wide range of features and properties described above for a porous magnetic architecture is achieved while still retaining the desirable through-connected voids or pores 102, particularly in aerogel forms, which effectively provides for transport of gas-phase or solution species through the voids 102 of the porous magnetic architectures 100.

Figure 2:
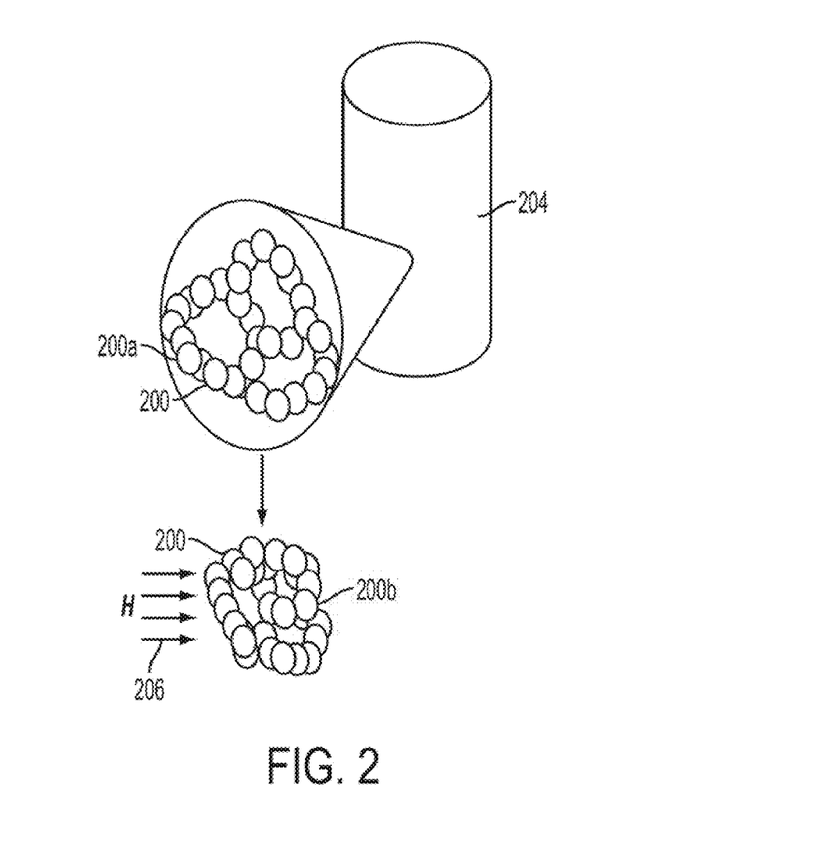
FIG. 2 is a schematic illustrating the changes to a porous magnetic architecture in a porous magnetic architecture of the present invention.

Additionally, low-density, superparamagnetic aerogels that incorporate a porous magnetic architecture exhibit another property, which we refer to as "magnetocompliance." FIG. 2 is a schematic representation illustrating magnetocompliant behavior for an example aerogel monolith 204 including a porous magnetic architecture 200 shown in a first configuration 200a without the presence of a magnetic field 206 and in a second configuration 200b in the presence of a magnetic field 206. A magnetocompliant behavior may be similarly achieved by reducing the temperature of the porous magnetic architecture below the blocking temperature, i.e., the physical property temperature at which metal begin to exhibit magnetic behavior without the presence of a magnetic field. As such a magnetic source may either be a magnet or other apparatus for applying a magnetic field or may be a cooling system that is capable of dropping the temperature of a porous magnetic architecture below the blocking temperature. When magnetized by the presence of a magnetic field, by reducing the temperature to below the blocking temperature or both, porous magnetic architecture 200 becomes significantly distorted (configuration 200b) and exhibits a magnetization-controlled pore-size reduction from porous magnetic architecture 200 when not magnetized (configuration 200a).

Magnetocompliant porous magnetic architectures such as those described herein exhibit several key advantages with regard to applications based on magnetomechanical properties. Unlike ferrogel composites, in which the ferrogel composite exhibits large magnetomechanical deformations in a magnetic field, porous magnetic architectures have defined pore structures with tunable pore sizes and volumes. The nanoscopic dimensions of both the pores and network of particles of the porous magnetic architecture will be critical in maximizing the interactions of solute gases and liquids introduced into and intermingling within the pores of the porous magnetic architecture.

The magnetocompliant effect will depend on the elasticity of the porous magnetic architecture, which in the case of aerogels is particularly facilitated by the extensive free-volume of the porous magnetic architecture and the spatially dispersed network of bonded particles that define the porous magnetic architecture. Another advantage of the porous magnetic architectures of the present invention is that they generally exhibit superparamagnetic behavior and thus readily lose their magnetization when the applied field is removed or the temperature is raised above the blocking temperature. This property will promote greater reversibility with respect to magnetocompliance.

The ability to manipulate the porous magnetic architecture with an applied magnetic field makes the porous magnetic architecture particularly used, for example, in or as a membrane. Such a membrane may be useful as a filter, or as a sequestration or retention matrix to inhibit the permeation of certain solutes through the porous magnetic architecture. The permeation of solutes through porous magnetic architectures will depend on the size, distribution and connectivity of the pores, the size and concentration of the solute and the nonuniformity of the internal magnetic field based on the aperiodicity of the nanoparticles forming the porous magnetic architecture. Thus, with the porous magnetic architecture used in or as a membrane, the magnetocompliant effect may be exploited to control permeation rates through the membrane via magnetically controlled distortions of the pores sizes and pore volume of the porous magnetic architecture. For sequestration or retention applications this same effect also may be used to control the equilibrium condensation of solute gases within the porous magnetic architecture, a process that also depends on the dimensions of the pores in the porous magnetic architecture. The magnetocompliant effect illustrated in FIG. 2 is likely accompanied by changes in the macroscopic dimensions of a membrane, which would be advantageous for actuator applications. Another application of such a membrane is as a vehicle for the magnetically controlled release of a solute, for example pharmaceutical agents. A porous magnetic architecture may be designed to control the release of pharmaceutical agents entrapped within its pores.

EXAMPLE 1

Figure 3A:
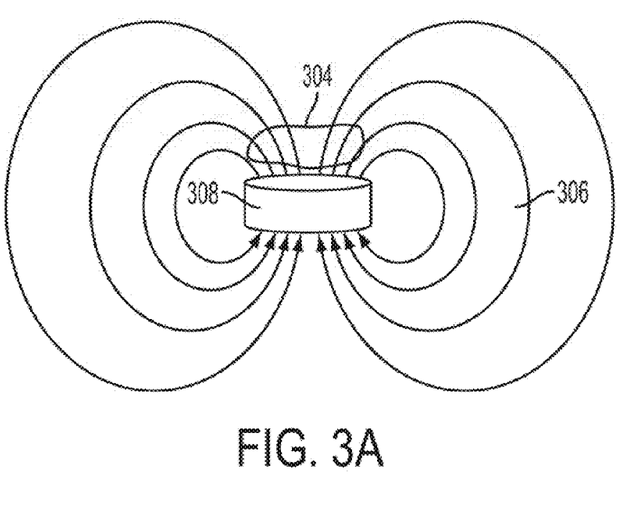
FIG. 3A is a schematic illustrating an example of the application of a magnetic field to a porous magnetic architecture of the present invention.
Figure 3B:
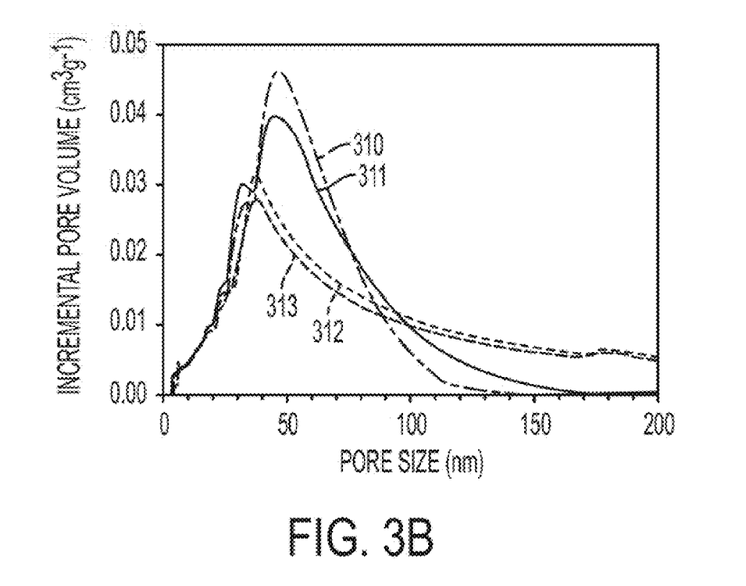
FIG. 3B is a pore-size distribution plot derived from $N_2$-sorption data for an example nanocrystalline $Fe_3O_4/\gamma$-$Fe_2O_3$ nanoarchitecture aerogel monolith.

The magnetocompliance of a nanocrystalline $Fe_3O_4/\gamma\text{-}Fe_2O_3$ porous magnetic architecture was first evidenced by $N_2$-sorption porosimetry analysis at 77 degrees Kelvin, as illustrated in FIGS. 3A and 3B. FIG. 3A is a schematic illustrating the application of a magnetic field 306 to an aerogel monolith 304 incorporating a porous magnetic architecture of the present invention from a magnetic source 308. In this nonlimiting example, the temperature of 77 degrees Kelvin is also below the blocking temperature of the $Fe_3O_4/\gamma\text{-}Fe_2O_3$ porous magnetic architecture.

FIG. 3B is a pore-size distribution plot derived from $N_2$-sorption data for an example aerogel monolith incorporating a nanocrystalline $Fe_3O_4/\gamma\text{-}Fe_2O_3$ porous magnetic architecture, such as aerogel monolith 304. In this example, incremental pore volume as a function of pore size was characterized for the aerogel monolith in its native state and in the presence of a single SmCo permanent magnet. Curve 310 plots the pore volume of the aerogel monolith in an initial state, without a magnetic field applied. Curve 313 plots the pore volume of the aerogel monolith after the first application of a magnetic field. Curve 311 plots the pore volume of the aerogel monolith once the first application of a magnetic field is removed. Curve 312 plots the pore volume of the aerogel monolith upon the application of a second magnetic field. As shown in FIG. 3B, magnetocompliance is generally reversible. Upon application of a first magnetic field, the porous magnetic architecture exhibits a first pore volume reduction. Once the magnetic field is removed, the porous magnetic architecture reverts to very nearly its original pore structure. Upon the application of a second magnetic field identical to the first magnetic field, the porous magnetic architecture again reverts to a second pore volume reduction that is very nearly the same as the first pore volume reduction. Because of this reversible behavior, these materials might be referred to as magnetoelastic.

The magnetoelastic behavior is likely due to the inhomogeneous distribution of magnetic forces that arises as the aperiodic network of nanoparticles comprising the porous magnetic architecture attempts to move and align with the externally imposed magnetic field or magnetization and the resulting internal field gradients. As illustrated in the Examples below, the degree of structural distortion, and thus change in pore volume, will depend on such factors as the strength of the magnetization, the magnetic character of the porous magnetic architecture, the distribution of internal magnetic field gradients that arise within the porous magnetic architecture, and the elasticity of the porous magnetic architecture. One advantage of forming porous magnetic architecture aerogels is that previous studies have shown that $SiO_2$ aerogels are very compliant materials. See C. J. Brinker et al., *Sol-gel Science*, Chapter 7, "Theory of deformation and flow in gels," Academic Press, New York (1990), which is incorporated herein by reference in its entirety. Thus, magnetization allows the porous magnetic architecture to easily deform.

EXAMPLE 2

Synthesis of porous magnetic architecture. Porous magnetic architecture made with mixed-metal oxides with the general formula $MFe_2O_4$, where M=Fe, Mn, Co, Ni, Zn, and Cu are initially generated as wet, monolithic gels using sol-gel chemistry methods modified from a published protocol for the synthesis of iron oxide gels. See A. E. Gash et al., "Use of epoxides in the sol-gel synthesis of porous iron(III) oxide monoliths from Fe(III) salts," *Chem. Mater.*, Vol. 13, No. 3, pp. 999-1007 (March 2001), which is incorporated herein by reference in its entirety. The wet gels are further processed to dry forms using various procedures to remove the pore fluid. Supercritical $CO_2$ drying yields low-density, ultraporous aerogels. Ambient-pressure drying using an alkane pore fluid (i.e., hexane or cyclohexane) yields moderate-density porous magnetic architectures, denoted as ambigels. If the wet gels are dried from the native pore-filling fluid, typically an alcohol (which, for example, may contain some percentage of water), a low-density porous magnetic architecture results, termed a xerogel. The porous magnetic architectures are typically amorphous, and thus poorly magnetic, so that further thermal processing is required to produce nanocrystalline forms, with typical processing temperatures of 250 to 400° C. The porous magnetic architectures may be characterized by powder X-ray diffraction and transmission electron microscopy to determine the crystalline phase and crystallite size distribution. The magnetic properties of these materials also may be explored using vibrating sample magnetometry (VSM) and thermal magnetization (SQUID) methods.

Evaluation of porous magnetic architecture by $N_2$-sorption porosimetry. $N_2$-sorption porosimetry methods were used at liquid $N_2$ temperatures (about 77 degrees Kelvin) to evaluate such characteristics as specific surface area, cumulative pore volume, and pore-size distributions. Specific surface areas may be derived by the multipoint BET (Brunauer-Emmett-Teller) method, and pore volumes may be derived by the BJH (Barrett-Joyner-Halenda) method. Isotherm data from the $N_2$-sorption process can be used to generate pore-size distribution (PSD) plots using one of several established models for gas sorption and pore filling. The Halsey thickness model (cylinder pore geometry) was used to generate the PSD plots of FIGS. 3B, 5B, 6 and 8-10. Other pore-filling models produced qualitatively similar results.

Figure 4:
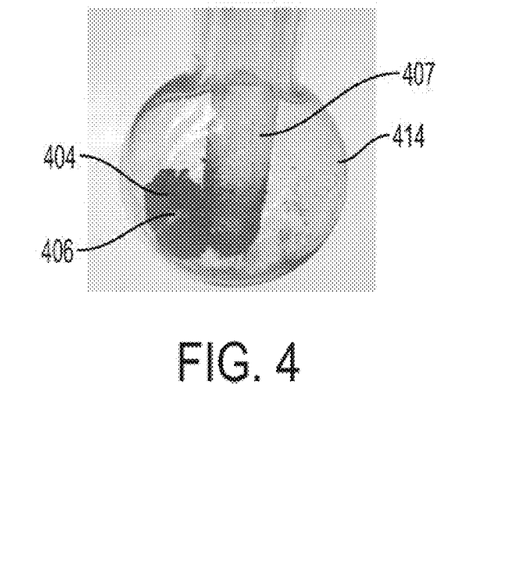
FIG. 4 is porosimetry analysis tube for analysis of the porous magnetic architectures of the present invention.

As illustrated in FIG. 4, to investigate the effects of magnetization on the pore-structure of porous magnetic architecture, permanent magnets 406, for example, either a NdFeB or SmCo magnet, were included in a porosimetry analysis tube 414 along with the porous magnetic architecture 404, for example, in the form of a monolith or coarse powder sample. The porous magnetic architecture (shown in coarse powder form in FIG. 4) is attracted to and held in place by the permanent magnet 406, which in FIG. 4 is a SmCo disk magnet. The strength of the magnetic field near the surface of these permanent magnets 406 is estimated to be about 0.2 Tesla. After the porous magnetic architecture 404 and permanent magnets 406 are introduced into the sample tube, the apparatus is cooled to 77 K using liquid nitrogen, at which point gaseous nitrogen is introduced in controlled increments. The volume of nitrogen adsorbed to the surface of the porous magnetic architecture 404 is then measured as a function of the relative pressure of the applied nitrogen gas. FIG. 4 also includes a fill rod 407 to reduce the volume of the porosimetry analysis tube 414 such that less $N_2$ is needed.

The reversibility of the magnetocompliance effect is determined by first collecting the sample after the porosimetry analysis in the presence of the permanent magnet 406, and then re-running the same analysis for the recovered sample, but with no magnet present. Each of the nanocrystalline porous magnetic architectures 404 examined with this method has been superparamagnetic at room temperature. Thus, once the porous magnetic architecture 404 is warmed to room temperature between the porosimetry tests and the permanent magnets 406 are removed, porous magnetic architectures 404 loses its magnetization.

The analysis gas, nitrogen or $N_2$, is a diamagnetic molecule. $N_2$ has a magnetic susceptibility of about −12 cgs. As discussed below with respect to Example 6, however, any slight magnetic repulsive force experienced by the $N_2$ in the presence of a strong magnetic field does not appreciably alter the effects of the magnetic field on the porous magnetic architecture 404.

Figure 11:
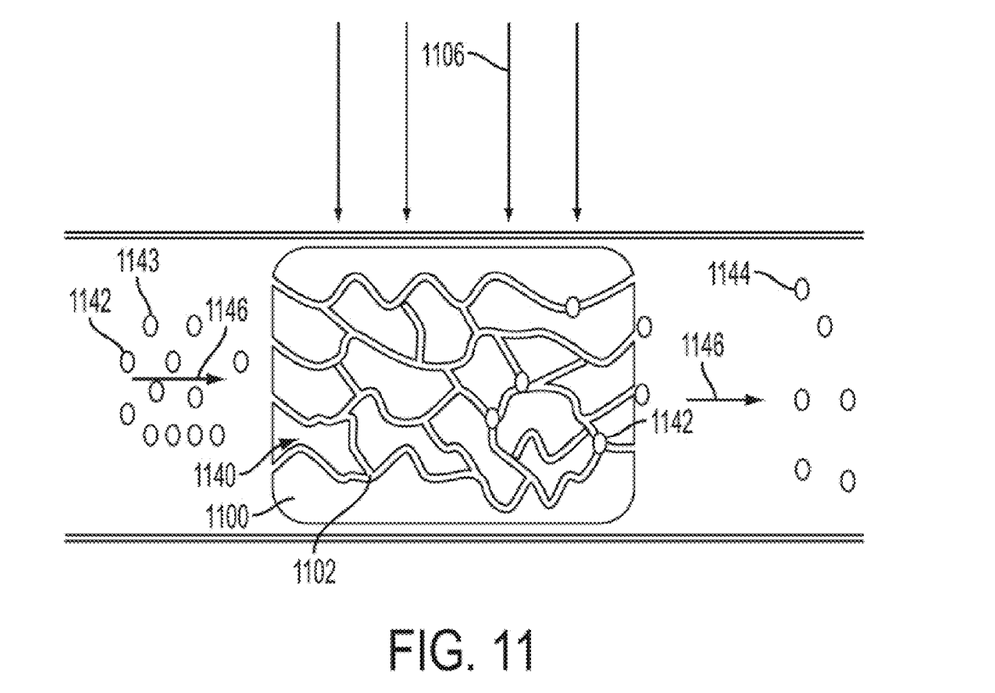
FIG. 11 is a schematic illustrating magnetically based separation of solute components in a flow stream.

The solute may have a particle size of about 5-100 nm or may be a molecule or a biomolecule having a size less than 10 nm, which may be equal to, less than or larger than the initial pore size of the porous magnetic architecture, depending upon the application. For example, if the application is to filter a solute of interest, the pore size of the porous magnetic architecture may be sufficiently small to inhibit or alternatively block the mobility of particles of the solute of interest through the porous magnetic architecture. FIG. 11, for example, is a schematic representation of a use of a membrane 1140 of a porous magnetic architecture 1100. The network of the porous magnetic architecture 1100 defines pores 1102 therein. A mixture of a larger solute 1142 with a larger particle size and a smaller solute 1144 with a smaller particle size may be provided in a flow path 1146 through the membrane 1140. When magnetized, for example by applying a magnetic field 1106 to the membrane 1140, the size of pores 1102 are reduced such that smaller solute 1144 may move through membrane 1140 more quickly than larger solute 1142, or alternatively such that larger solute 1142 may not move through the membrane at all. Thus, membrane 1140 may function as a separating matrix or filter to separate the smaller solute 1144 from the larger solute 1142.

Alternatively, if the application is to entrap a solute, the pore size of the porous magnetic architecture may be initially greater than the particle size of the solute, allowing the solute to flow into the pores of porous magnetic architecture before the pore size is reduced when magnetized to a pore size sufficiently small relative to the particle size of the solute to entrap the solute within the pores.

Further, a solute that is exposed to the porous magnetic architecture may be diamagnetic, paramagnetic, or superparamagnetic. Depending upon the magnetic nature of the solute, FIG. 11 may not only represent a mechanical separation of particles. Rather than solutes 1142 and 1144 having different particle sizes, the particles may be of same or different sizes, but solute 1142 has a different magnetic susceptibility than solute 1144. When magnetized, for example by the presence of the magnetic field 1106, solute 1142 is affected by internal surface magnetic forces within the particle network of the porous magnetic architecture 1100 while solute 1144 is less affected by the internal magnetic forces. Thus, the flow of solute 1142 is impeded while the flow of solute 1144 is not, causing a separation of solute 1142 and 1144 through membrane 1140. For example, magnetic attraction may be used as the basis for separating and concentrating molecules of high magnetic susceptibility, such as molecular oxygen, from a mixture of liquid- or gas-phase molecules. A similar approach was previously described by J. Gwak et al., "Synthesis and characterization of porous ferromagnetic membranes," *Micropor. Mesopor. Mater.*, Vol. 63, pp. 177-184 (2003), which is incorporated by reference herein in its entirety. Gwak et al. attempted to separate $O_2$ from an $O_2/N_2$ mixture. However, the porous magnetic architectures described in the present invention are more advantageous for magnetically based separations due to their inherent through-connected pore networks with relatively small pores (1-100 nanometers) and pore size distributions.

As illustrated in Table 1 and in Examples 3-6 below, the degree of structural distortion will depend on such factors as the strength of the magnetization, the magnetic character of the porous magnetic architecture, and the elasticity of the porous magnetic architecture.

Table 1 below illustrates porosimetry results for some examples of porous magnetic architectures of the present invention with and without magnetization. The same techniques discussed above were used in the preparation and measurements of these porous magnetic architectures. The measurement of percent pore loss in Table 1 includes an accuracy of ±2-5%.

TABLE 1

| Sample/Conditions | Surface area ($m^2 g^{-1}$) | Pore volume ($cm^3 g^{-1}$) | % Pore volume loss |
|---|---|---|---|
| Nanocrystalline $Fe_3O_4/\gamma$-$Fe_2O_3$ aerogel, Single magnet | | | |
| 1. Initial, no magnet | 138 | 0.888 | 16 |
| 2. With magnet | 136 | 0.748 | |

TABLE 1-continued

| Sample/Conditions | Surface area ($m^2 g^{-1}$) | Pore volume ($cm^3 g^{-1}$) | % Pore volume loss |
|---|---|---|---|
| Poorly crystalline $\gamma$-$Fe_2O_3$ aerogel Single magnet | | | |
| 1. Initial, no magnet | 245 | 2.58 | 4 |
| 2. With magnet | 247 | 2.48 | |
| Nanocrystalline $Fe_3O_4/\gamma$-$Fe_2O_3$ aerogel Paired magnets | | | |
| 1. Initial, no magnet | 130 | 0.880 | 34 |
| 2. With magnet | 86 | 0.580 | |
| Nanocrystalline $NiFe_2O_4$ aerogel Single magnet | | | |
| 1. Initial, no magnet | 90.6 | 0.819 | 44 |
| 2. With magnet | 93.1 | 0.459 | |
| 3. Recovered, no magnet | 111 | 0.963 | 37 |
| 4. Recovered, with magnet | 114 | 0.605 | |
| Nanocrystalline $ZnFe_2O_4$ aerogel Single magnet | | | |
| 1. Initial, no magnet | 118 | 0.810 | 27 |
| 2. With magnet | 117 | 0.594 | |
| Nanocrystalline $Fe_3O_4/\gamma$-$Fe_2O_3$ ambigel Single magnet | | | |
| 1. Initial, no magnet | 169 | 0.391 | 0 |
| 2. With magnet | 167 | 0.389 | |

EXAMPLE 3

Figure 5A:
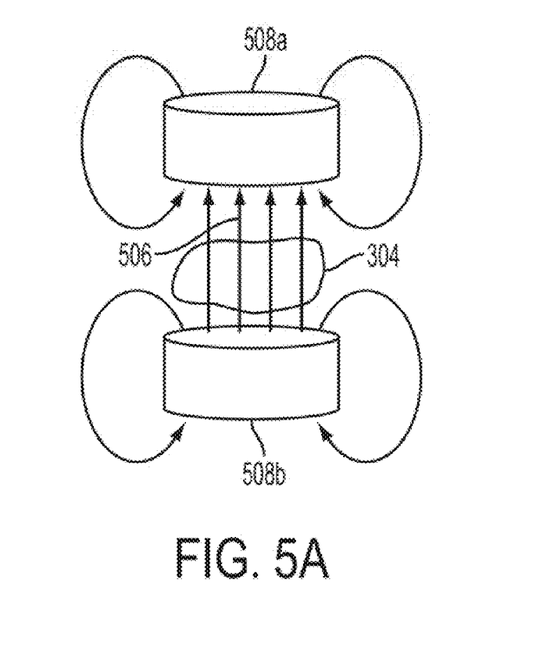
FIG. 5A is a schematic illustrating an example of the application of a magnetic field to a porous magnetic architecture of the present invention.
Figure 5B:
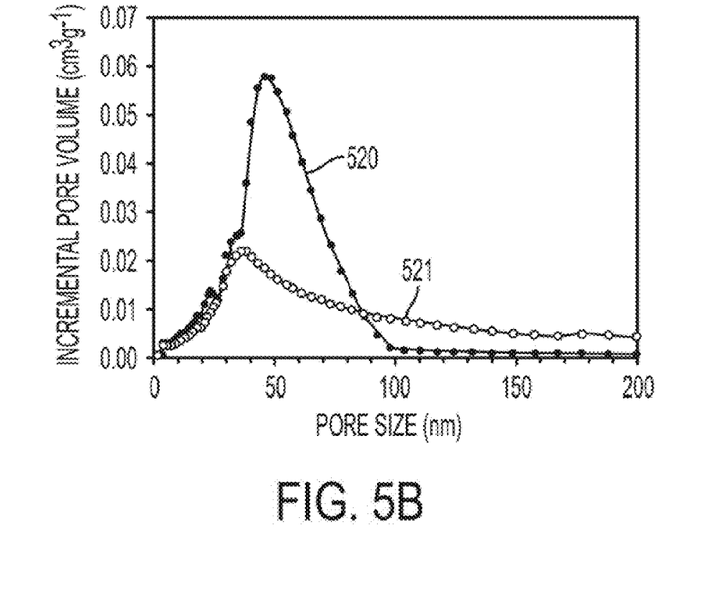
FIG. 5B is a pore-size distribution plot derived from $N_2$-sorption data for an example nanocrystalline $Fe_3O_4/\gamma$-$Fe_2O_3$ nanoarchitecture aerogel monolith in the presence of different strength magnetic fields.

As Table 1 and FIGS. 3A and 3B illustrate, in the presence of a single small SmCo magnet, the nanocrystalline $Fe_3O_4$/$\gamma$-$Fe_2O_3$ aerogel loses 7-16% of its pore volume. However, as schematically illustrated in FIG. 5A, aerogel 304 was also subjected to a stronger and more uniform external field 506 of two paired magnet sources 508a and 508b with north-south axes positioned relative to the sample. As illustrated in Table 1 and FIG. 5B, aerogel 304 exhibits about a 34% pore volume decrease when in the presence of a magnetic field. In FIG. 5B, curve 520 plots the pore volume of an aerogel, such as aerogel 304, without the presence of a magnetic field. Curve 521 plots the pore volume of the same aerogel in the presence of two paired magnetic sources with north-south axes positioned relative to the aerogel sample.

EXAMPLE 4

Figure 6:
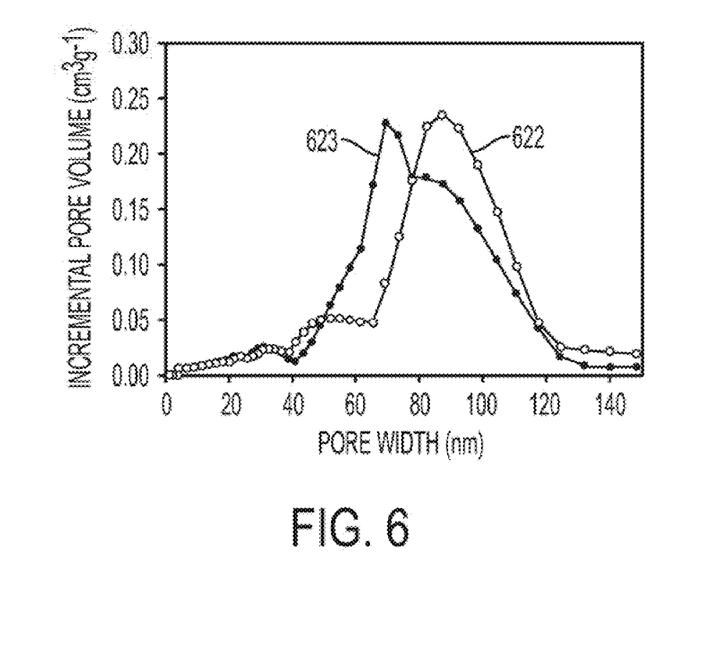
FIG. 6 is a pore-size distribution plot derived from $N_2$-sorption data for an example of a poorly crystalline $\gamma$-$Fe_2O_3$ aerogel monolith.
Figure 7:
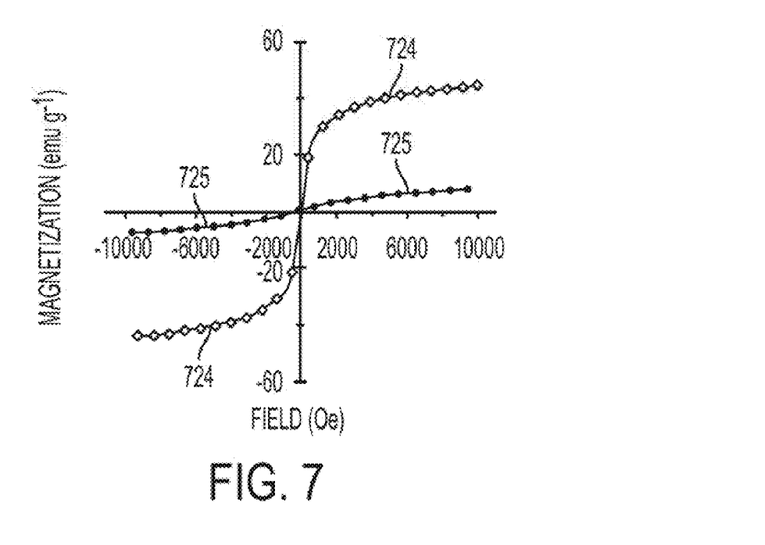
FIG. 7 is a comparison of vibrating sample magnetometry at room temperature for an example nanocrystalline $Fe_3O_4/\gamma$-$Fe_2O_3$ aerogel, and for a poorly crystalline $\gamma$-$Fe_2O_3$ aerogel.

FIG. 6 illustrates a pore-size distribution plot derived from $N_2$-sorption data for a poorly crystalline $\gamma$-$Fe_2O_3$ aerogel in its native state at curve 623 and in the presence of a single SmCo magnet 622. The nanocrystalline $Fe_3O_4/\gamma$-$Fe_2O_3$ aerogel and the poorly crystalline $\gamma$-$Fe_2O_3$ aerogel are derived from the same sol-gel chemistry, but the nanocrystalline $Fe_3O_4/\gamma$-$Fe_2O_3$ aerogel, is heat-treated at 260° C. under an argon atmosphere while the poorly crystalline $\gamma$-$Fe_2O_3$ aerogel is heat-treated at 260° C. under an air atmosphere. As shown in Table 1 and FIG. 6, poorly crystalline $\gamma$-$Fe_2O_3$ aerogels undergo a small to no structural change (about 4% pore volume loss, wherein the accuracy of measurement is ±2-5%). One rationale for the lack of magnetocompliance in poorly crystalline $\gamma$-$Fe_2O_3$, as illustrated in FIG. 7, may be due to the fact that poorly crystalline metal oxide aerogels characterized by curve 725 have lower magnetization relative to more crystalline metal oxide aerogel forms characterized by curve 724.

EXAMPLE 5

Figure 8:
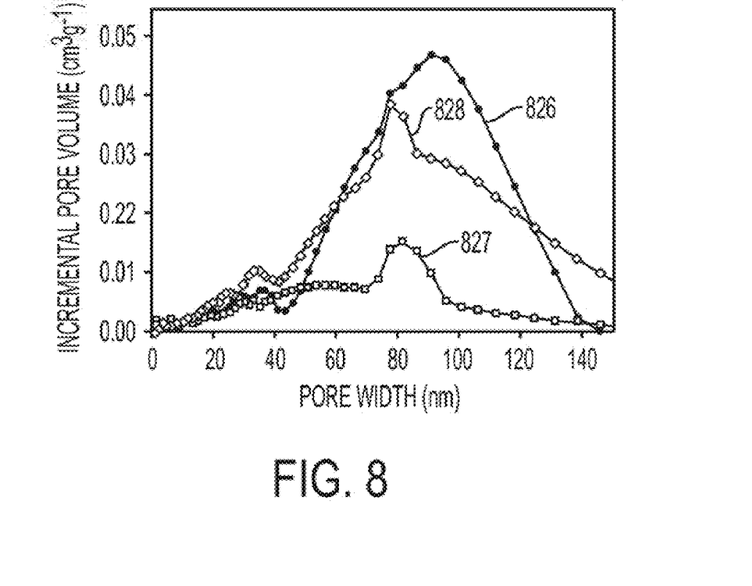
FIG. 8 is a pore-size distribution plot derived from $N_2$-sorption data for an example $NiFe_2O_4$ aerogel monolith.
Figure 9:
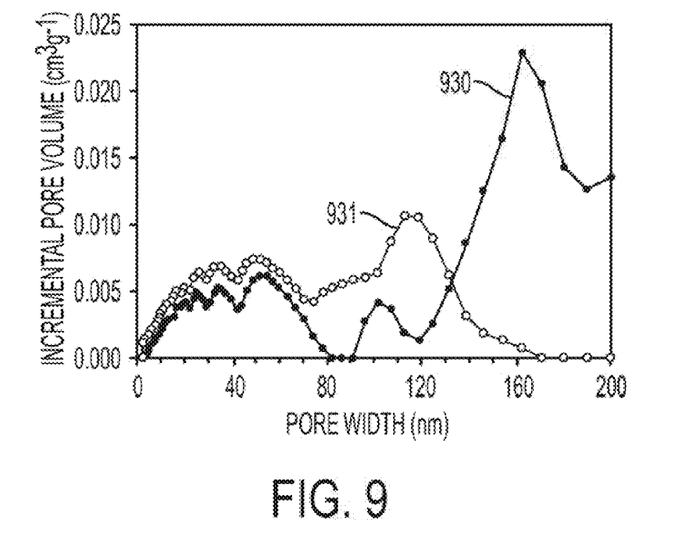
FIG. 9 is a pore-size distribution plot derived from $N_2$-sorption data for an example $ZnFe_2O_4$ aerogel monolith.

The effects of the magnetic character of the porous magnetic architecture are further understood by considering two aerogels with similar porous magnetic architectures but different compositions, specifically comparing the magnetic character of $NiFe_2O_4$ and $ZnFe_2O_4$ aerogels. These two aerogel compositions have nearly identical initial pore volumes. As illustrated in Table 1 and FIGS. 8 and 9, the $NiFe_2O_4$ aerogel exhibits a 44% pore volume loss in the presence of a magnetic field compared to a 27% pore volume loss for the $ZnFe_2O_4$ aerogel under identical conditions. In FIG. 8, curve 826 plots the pore volume of the $NiFe_2O_4$ aerogel in an initial state, without a magnetic field applied. Curve 827 plots the pore volume of the $NiFe_2O_4$ aerogel after the first application of a magnetic field. Curve 828 plots the pore volume of the $NiFe_2O_4$ aerogel once the first application of a magnetic field is removed. Similarly, in FIG. 9, curve 930 plots the pore volume of the $ZnFe_2O_4$ aerogel in an initial state, without an external magnetic field applied. Curve 931 plots the pore volume of the $ZnFe_2O_4$ aerogel after the first application of a magnetic field. This discrepancy may be ascribed to the lower magnetization of $ZnFe_2O_4$ porous magnetic architecture within the aerogel.

EXAMPLE 6

Figure 10:
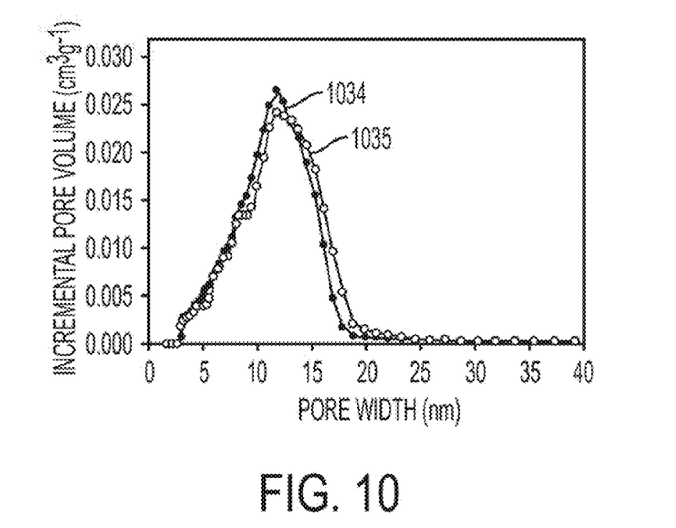
FIG. 10 is a pore-size distribution plot derived from $N_2$-sorption data for an example nanocrystalline $Fe_3O_4/\gamma$-$Fe_2O_3$ aerogel and an example nanocrystalline $Fe_3O_4/\gamma$-$Fe_2O_3$ ambigel.

The mechanical properties of the network comprising the porous magnetic architecture will also strongly influence the magnetocompliance effect. Porosimetry experiments were performed for two different nanocrystalline $Fe_3O_4/\gamma\text{-}Fe_2O_3$ porous magnetic architectures, specifically an aerogel and an ambigel, were compared. The ambigel was produced by ambient pressure drying from an alkane pore fluid, in the manner described above. After the thermal processing step to induce crystallization, the $Fe_3O_4/\gamma\text{-}Fe_2O_3$ ambigel form is about 50% more dense than the corresponding $Fe_3O_4/\gamma\text{-}Fe_2O_3$ aerogel, and exhibits lower overall pore volume and smaller pore sizes. As a result, the denser ambigel is more mechanically rugged than the aerogel. Although they have different architectures and mechanical properties, the ambigel and aerogel exhibit very similar magnetic properties, as they are both composed of $Fe_3O_4/\gamma\text{-}Fe_2O_3$ nanocrystallites of approximately the same size and crystal habit. However, as illustrated in Table 1 and FIG. 10, when the ambigel is analyzed by $N_2$-sorption porosimetry, no significant structural changes are observed in the presence of an applied magnetic field. In FIG. 10, curve 1034 plots the pore volume of the ambigel in an initial state, without a magnetic field applied. Curve 1035 plots the pore volume of the ambigel after the first application of a magnetic field. The lack of any field-induced distortions suggests that the increased stiffness of the ambigel is sufficient to oppose the magnetic forces operating on the $Fe_3O_4/\gamma\text{-}Fe_2O_3$ network.

FIG. 10 also illustrates that there are no experimental anomalies with regard to the $N_2$-sorption measurements. As mentioned earlier, $N_2$ is a diamagnetic molecule and thus should experience a slight repulsive force in the presence of a strong magnetic field. If this slight repulsion were responsible for the changes in the $N_2$-sorption isotherms that we observe in the presence of external magnetic fields, we would expect to find similar changes for both the ambigel and aerogel forms of the $Fe_3O_4/\gamma\text{-}Fe_2O_3$ porous magnetic architecture, as they exhibit comparable magnetic properties. The fact that there was no significant change in the porosimetry for the ambigel in the presence of the external magnetic field strongly suggests that the $N_2$-sorption and pore-filling process itself is not appreciably altered by the magnetic field, but rather that the ambigel is too mechanically rigid to undergo magnetomechanical distortion.

The magnetocompliance effect observed is presumably not limited to sol-gel-derived porous magnetic architectures, but would be observed for other materials that comprised a pliable network of magnetic nanoparticles or nanofibers. Some related examples would include mesoporous iron oxides prepared via template-directed synthesis, networks of magnetic core-shell nanoparticles (i.e., $Fe/Fe_3O_4$), or networks of nanoparticles or nanofibers chemically crosslinked by polymer chains. Also, in other embodiments, a porous magnetic architecture of the present invention may be provided in a composite, such as a polymer matrix. Also a solute may be provided in a polymer matrix or solvent in which the solute is pre-concentrated or highly soluble to aid the solute through the pores of the porous magnetic architecture.

While the invention has been particularly shown and described with reference to preferred embodiments thereof, it will be understood by those skilled in the art that they have been presented by way of example only, and not limitation, and various changes in form and details can be made therein without departing from the spirit and scope of the invention. Thus, the breadth and scope of the present invention should not be limited by any of the above-described exemplary embodiments, but should be defined only in accordance with the following claims and their equivalents. Additionally, all references cited herein, including issued U.S. patents, or any other references, are each entirely incorporated by reference herein, including all data, tables, figures, and text presented in the cited references. Also, it is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

What is claimed as new and desired to be protected by Letters Patent of the United States is:

1. A method for controlling pore size of a membrane, comprising the steps of:
    (a) providing a membrane including a nonuniform porous magnetic architecture comprising a monolith including a three-dimensional network of metal ferrite particles and a through connected network of void volume, the architecture having a first pore size; and
    (b) magnetizing the nonuniform porous magnetic architecture, wherein the nonuniform porous magnetic architecture has a second pore size when magnetized that is different from the first pore size.

2. The method of claim 1, wherein the magnetizing step includes applying a magnetic field.

3. The method of claim 1, wherein the porous magnetic architecture is selected from the group consisting of an ambigel, an aerogel of and a xerogel, wherein the ambigel, aerogel, or xerogel is formed by drying a wet gel.

4. The method of claim 1, wherein the metal ferrite particles are mixed-metal oxide particles of the general formula $MFe_2O_4$, wherein M is selected from the group consisting of Fe, Mn, Co, Ni, Zn and Cu.

5. The method of claim 1, wherein the first pore size of the nonuniform porous magnetic architecture is 1-100 nm.

6. The method of claim 1, wherein the first pore size is greater than the second pore size.

7. The method of claim 1, wherein the second pore size constitutes at least a 4% pore volume loss over the first pore size.

8. The method of claim 1, wherein the difference between the first pore size and the second pore size is increased when strength of the magnetic field is increased.

9. The method of claim 1, further comprising the step of:
(c) ceasing magnetizing the porous magnetic architecture, wherein the nonuniform porous magnetic architecture has a third pore size when subsequently not magnetized that is about equal to the first pore size.

10. The method of claim 1, wherein the nonuniform porous magnetic architecture comprises nanocrystallites which have a size of 3-25 nm.

11. The method of claim 1, wherein the monolith is a sol-gel derived monolith.

12. The method of claim 1, wherein the monolith is nanocrystalline.

13. A method for controlling pore size of a membrane, comprising the steps of:
(a) providing a membrane including a nonuniform porous magnetic architecture comprising a network of metal ferrite particles having a first pore size; and
(b) magnetizing the nonuniform porous magnetic architecture, the magnetization including lowering the temperature of the porous magnetic architecture below its blocking temperature, the nonuniform porous magnetic architecture having a second pore size, when magnetized, that is different from the first pore size.

14. A method for selectively inhibiting the mobility of a solute through a membrane comprising the steps of:
(a) providing a solute in a flow stream;
(b) providing a membrane in the flow stream including a gel-derived nonuniform porous magnetic architecture comprising a network of metal ferrite particles and a through connected network of void volume;
(c) magnetizing the nonuniform porous magnetic architecture, wherein when subjected to the magnetic field the mobility of the solute through the nonuniform porous magnetic architecture is inhibited.

15. The method of claim 14, wherein the nonuniform porous magnetic architecture has a first pore size prior to magnetization and a second pore size upon magnetization, wherein the first pore size is greater than the second pore size.

16. The method of claim 15, wherein the first pore size of the nonuniform porous magnetic architecture is greater than the solute and the second pore size is sufficiently small relative to the solute wherein the method further comprises the step of:
(d) entrapping the solute in the nonuniform porous magnetic architecture upon magnetization.

17. The method of claim 15, wherein the second pore size of the nonuniform porous magnetic architecture is sufficiently small relative to the solute that the mobility of the solute through the nonuniform porous magnetic architecture is inhibited.

18. The method of claim 15, wherein the second pore size of the nonuniform porous magnetic architecture is sufficiently small relative to the solute wherein the flow of the solute through the nonuniform porous magnetic architecture is blocked.

19. The method of claim 14, wherein the solute is selected from the group consisting of a particle having a particle size of about 5-100 nm and a molecule having a molecule size of less than about 10 nm.

20. The method of claim 14, wherein the solute is selected from the group consisting of diamagnetic materials, paramagnetic materials, superparamagnetic materials, or quadrapolar materials.

21. The method of claim 18, wherein the solute is affected by internal magnetic forces of the nonuniform porous magnetic architecture when magnetized in order to inhibit mobility of the solute through the nonuniform porous magnetic architecture.

22. A membrane system for a solute, comprising:
a solute in a flow stream;
a nonuniform porous magnetic architecture comprising a gel-derived monolith including a network of metal ferrite particles disposed within the flow stream; and
a magnetic source disposed such that the nonuniform porous magnetic architecture is selectively magnetized from the magnetic source.

23. The membrane system of claim 22, wherein the nonuniform porous magnetic architecture has a first pore size when not magnetized by the magnetic source and a second pore size when magnetized by the magnetic source.

24. The membrane system of claim 23, wherein the second pore size is different from the first pore size and the second pore size is sufficiently small so as to inhibit the mobility of the solute through the nonuniform porous magnetic architecture.

25. The membrane system of claim 23, wherein the first pore size of the nonuniform porous magnetic architecture is greater than the solute and wherein the second pore size of the nonuniform porous magnetic architecture is sufficiently small relative to the solute wherein the solute is entrapped in the nonuniform porous magnetic architecture when magnetized by the magnetic source.

26. The membrane system of claim 22, wherein the solute is affected by internal magnetic forces of the nonuniform porous magnetic architecture, when magnetized by the magnetic source, in order to inhibit mobility of the solute through the nonuniform porous magnetic architecture.

27. The method of claim 22, wherein the monolith includes a through connected network of void volume.

* * * * *